United States Patent
Nickels et al.

(10) Patent No.: US 11,747,154 B2
(45) Date of Patent: *Sep. 5, 2023

(54) NETWORK SYSTEM FOR PRESELECTING A SERVICE PROVIDER BASED ON PREDICTIVE INFORMATION

(71) Applicant: Uber Technologies, Inc., San Francisco, CA (US)

(72) Inventors: John Mark Nickels, San Francisco, CA (US); Eoin O'Mahony, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,841

(22) Filed: Aug. 5, 2021

(65) Prior Publication Data

US 2021/0364302 A1 Nov. 25, 2021

Related U.S. Application Data

(63) Continuation of application No. 16/787,601, filed on Feb. 11, 2020, now Pat. No. 11,099,019, which is a (Continued)

(51) Int. Cl.
*H04L 41/50* (2022.01)
*H04L 41/5051* (2022.01)
(Continued)

(52) U.S. Cl.
CPC ......... *G01C 21/3438* (2013.01); *G01C 21/20* (2013.01); *G06Q 50/30* (2013.01);
(Continued)

(58) Field of Classification Search
CPC .... G01C 21/02; G01C 21/3438; G06Q 50/30; G08G 1/202; H04L 41/5019;
(Continued)

(56) References Cited

U.S. PATENT DOCUMENTS 4,023,753 A 5/1977 Dobler
5,168,451 A 12/1992 Bolger
(Continued)

FOREIGN PATENT DOCUMENTS

CA 2889853 5/2014
CN 102495541 11/2012
(Continued)

OTHER PUBLICATIONS

Rosenblat, Alex, and Luke Stark. "Algorithmic labor and information asymmetries: A case study of Uber's drivers." International journal of communication 10: July. (Year: 2016).*
(Continued)

*Primary Examiner* — John M Macilwinen
(74) *Attorney, Agent, or Firm* — MAHAMEDI IP LAW LLP

(57) ABSTRACT

A computing system detects activation of a service application on a computing device of a user. Based on a set of service factors, the system determines that a likelihood of the user requesting service exceeds a confidence threshold. Before receiving a request for service from the computing device of the user, and upon determining that the likelihood of the user requesting service exceeds the confidence threshold, the system performs a selection process to select a service provider to provide service for the user. Subsequent to performing the selection process, the system receives, from the computing device of the user, the request for service, and transmits, to a provider device of the selected service provider, an invitation for providing service for the user.

17 Claims, 7 Drawing Sheets

Related U.S. Application Data continuation of application No. 15/707,482, filed on Sep. 18, 2017, now Pat. No. 10,571,286, which is a continuation of application No. 15/395,818, filed on Dec. 30, 2016, now Pat. No. 9,813,510.

(60) Provisional application No. 62/399,793, filed on Sep. 26, 2016.

(51) Int. Cl.

| | | |
|---|---|---|
| *G01C 21/20* | (2006.01) | |
| *G06Q 50/30* | (2012.01) | |
| *H04W 4/02* | (2018.01) | |
| *H04L 67/52* | (2022.01) | |
| *G01C 21/34* | (2006.01) | |
| *H04L 67/306* | (2022.01) | |
| *H04L 41/5019* | (2022.01) | |
| *G08G 1/00* | (2006.01) | |

(52) U.S. Cl.
CPC .......... *G08G 1/202* (2013.01); *H04L 41/5019* (2013.01); *H04L 41/5051* (2013.01); *H04L 41/5058* (2013.01); *H04L 67/306* (2013.01); *H04L 67/52* (2022.05); *H04W 4/023* (2013.01)

(58) Field of Classification Search
CPC .............. H04L 41/5051; H04L 41/5058; H04L 67/306; H04L 67/52; H04W 4/023
See application file for complete search history.

(56) References Cited

U.S. PATENT DOCUMENTS

| | | | |
|---|---|---|---|
| 5,604,676 A | 2/1997 | Penzias | |
| 5,880,958 A | 3/1999 | Helms | |
| 5,945,919 A | 8/1999 | Trask | |
| 5,953,706 A | 9/1999 | Patel | |
| 6,212,393 B1 | 4/2001 | Suarez | |
| 6,356,838 B1 | 3/2002 | Paul | |
| 6,456,207 B1 | 9/2002 | Yen | |
| 6,516,056 B1 | 2/2003 | Justice et al. | |
| 6,618,593 B1 | 9/2003 | Drutman | |
| 6,756,913 B1 | 6/2004 | Ayed | |
| 6,925,381 B2 | 8/2005 | Adamcyzk | |
| 6,950,745 B2 | 9/2005 | Agnew | |
| 6,989,765 B2 | 1/2006 | Gueziec | |
| 7,062,376 B2 | 6/2006 | Oesterling | |
| 7,080,019 B1 | 7/2006 | Hurzeler | |
| 7,610,145 B2 | 10/2009 | Kantarjiev | |
| 7,822,426 B1 | 10/2010 | Wuersch | |
| 7,840,427 B2 | 11/2010 | O'Sullivan | |
| 7,886,019 B2 | 2/2011 | Srinivasachar | |
| 7,970,749 B2 | 6/2011 | Uhlir | |
| 8,140,256 B1 | 3/2012 | dos-Santos | |
| 8,285,571 B2 | 10/2012 | Demirdjian | |
| 8,362,894 B2 | 1/2013 | Shah | |
| 8,554,608 B1 | 10/2013 | O'Connor | |
| 8,630,987 B2 | 1/2014 | Prada | |
| 8,799,038 B2 | 8/2014 | Chen et al. | |
| 9,244,147 B1 | 1/2016 | Soundararajan | |
| 9,483,744 B2 | 11/2016 | Ford | |
| 9,488,484 B2 | 11/2016 | Ford | |
| 9,552,559 B2 | 1/2017 | Ford | |
| 9,558,469 B2 | 1/2017 | Ford | |
| 9,569,740 B2 | 2/2017 | Ford | |
| 9,599,481 B2 | 3/2017 | Ford | |
| 9,671,239 B2 | 6/2017 | Ford | |
| 9,689,694 B2 | 6/2017 | Ford | |
| 9,715,667 B2 | 7/2017 | Ford | |
| 9,939,279 B2 | 4/2018 | Pan | |
| 10,082,793 B1 | 9/2018 | Glaser | |
| 10,282,681 B2 | 5/2019 | Wang | |
| 10,467,561 B2 | 11/2019 | Haparnas | |
| 11,099,019 B2 * | 8/2021 | Nickels | ............... H04L 41/5058 |
| 11,153,395 B2 | 10/2021 | Sweeney | |
| 2001/0037174 A1 | 11/2001 | Dickerson | |
| 2001/0056363 A1 | 12/2001 | Gantz | |
| 2002/0034292 A1 | 3/2002 | Tuoriniemi et al. | |
| 2002/0044186 A1 | 4/2002 | Tochihara et al. | |
| 2002/0194129 A1 | 12/2002 | Furuya et al. | |
| 2003/0030666 A1 | 2/2003 | Najmi | |
| 2004/0024789 A1 | 2/2004 | Ditcharo et al. | |
| 2004/0049424 A1 | 3/2004 | Murray | |
| 2004/0106399 A1 | 6/2004 | Ki | |
| 2004/0107110 A1 | 6/2004 | Gottlieb et al. | |
| 2004/0148347 A1 | 7/2004 | Appelman | |
| 2004/0219933 A1 | 11/2004 | Faith | |
| 2004/0225520 A1 | 11/2004 | Aoki et al. | |
| 2004/0260470 A1 | 12/2004 | Rast | |
| 2005/0153707 A1 | 7/2005 | Ledyard | |
| 2005/0251333 A1 | 11/2005 | Adamzyk | |
| 2005/0278192 A1 | 12/2005 | Cantini et al. | |
| 2006/0004590 A1 | 1/2006 | Khoo | |
| 2006/0034201 A1 | 2/2006 | Umeda et al. | |
| 2006/0059023 A1 | 3/2006 | Mashinsky | |
| 2006/0200306 A1 | 9/2006 | Adamcyzk | |
| 2006/0217885 A1 | 9/2006 | Crady et al. | |
| 2006/0224437 A1 | 10/2006 | Gupta | |
| 2006/0235739 A1 | 10/2006 | Levis | |
| 2006/0242154 A1 | 10/2006 | Rawat | |
| 2006/0293937 A1 | 12/2006 | Sohm | |
| 2007/0011324 A1 | 1/2007 | Mehr | |
| 2007/0130156 A1 | 6/2007 | Tenhunen | |
| 2007/0150375 A1 | 6/2007 | Yang | |
| 2007/0167182 A1 | 7/2007 | Tenhunen | |
| 2007/0255627 A1 | 11/2007 | Hallowell | |
| 2007/0276595 A1 | 11/2007 | Lewinson | |
| 2008/0027772 A1 | 1/2008 | Gernega | |
| 2008/0055049 A1 | 3/2008 | Weill | |
| 2008/0091342 A1 | 4/2008 | Assael | |
| 2008/0177584 A1 | 7/2008 | Altaf et al. | |
| 2008/0195428 A1 | 8/2008 | O'Sullivan | |
| 2008/0270204 A1 | 10/2008 | Poykko | |
| 2008/0277183 A1 | 11/2008 | Huang | |
| 2009/0030885 A1 | 1/2009 | DePasquale | |
| 2009/0143965 A1 | 6/2009 | Chang et al. | |
| 2009/0176508 A1 | 7/2009 | Lubeck et al. | |
| 2009/0192851 A1 | 7/2009 | Bishop | |
| 2009/0216600 A1 | 8/2009 | Hill | |
| 2009/0254270 A1 | 10/2009 | Yu | |
| 2009/0281844 A1 | 11/2009 | Probst | |
| 2009/0296990 A1 | 12/2009 | Holland | |
| 2009/0313077 A1 | 12/2009 | Wheeler, IV | |
| 2009/0326991 A1 | 12/2009 | Wei | |
| 2010/0017275 A1 | 1/2010 | Carlson | |
| 2010/0042549 A1 | 2/2010 | Adamcyzk | |
| 2010/0070168 A1 | 3/2010 | Sumcad | |
| 2010/0153279 A1 | 6/2010 | Zahn | |
| 2010/0205017 A1 | 8/2010 | Sichelman et al. | |
| 2010/0207812 A1 | 8/2010 | Demirdjian | |
| 2010/0211498 A1 | 8/2010 | Aabye et al. | |
| 2010/0292914 A1 | 11/2010 | Vepsalinen | |
| 2011/0000747 A1 | 1/2011 | Wu | |
| 2011/0009098 A1 | 1/2011 | Kong | |
| 2011/0099040 A1 | 4/2011 | Felt et al. | |
| 2011/0118981 A1 | 5/2011 | Chamlou | |
| 2011/0145089 A1 | 6/2011 | Khunger | |
| 2011/0153495 A1 | 6/2011 | Dixon | |
| 2011/0153629 A1 | 6/2011 | Lehmann et al. | |
| 2011/0225257 A1 | 9/2011 | Tilden et al. | |
| 2011/0225269 A1 | 9/2011 | Yap et al. | |
| 2011/0243553 A1 | 10/2011 | Russell | |
| 2011/0251951 A1 | 10/2011 | Kolkowitz et al. | |
| 2011/0301985 A1 | 12/2011 | Camp et al. | |
| 2011/0301997 A1 | 12/2011 | Gale et al. | |
| 2011/0320230 A1 | 12/2011 | Podgumy | |
| 2012/0041675 A1 | 2/2012 | Juliver | |
| 2012/0059693 A1 | 3/2012 | Colodny et al. | |
| 2012/0072249 A1 | 3/2012 | Weir et al. | |
| 2012/0078671 A1 | 3/2012 | Mohebbi | |
| 2012/0078672 A1 | 3/2012 | Mohebbi | |
| 2012/0131170 A1 | 5/2012 | Spat | |
| 2012/0203599 A1 | 8/2012 | Choi | |

(56) References Cited

U.S. PATENT DOCUMENTS

| | | |
|---|---|---|
| 2012/0232943 A1 | 9/2012 | Myr |
| 2013/0018795 A1 | 1/2013 | Kolhatkar et al. |
| 2013/0024249 A1 | 1/2013 | Zohar |
| 2013/0054139 A1 | 2/2013 | Bodin |
| 2013/0054281 A1 | 2/2013 | Thakkar |
| 2013/0073327 A1 | 3/2013 | Edelberg |
| 2013/0090963 A1 | 4/2013 | Sharma |
| 2013/0102333 A1 | 4/2013 | Dam |
| 2013/0132140 A1 | 5/2013 | Amin |
| 2013/0144831 A1 | 6/2013 | Atlas |
| 2013/0158861 A1 | 6/2013 | Lerenc |
| 2013/0179205 A1 | 7/2013 | Slinin |
| 2013/0179215 A1 | 7/2013 | Slinin |
| 2013/0295963 A1 | 11/2013 | Sen |
| 2014/0011522 A1* | 1/2014 | Lin .................. H04W 4/02 455/456.2 |
| 2014/0025410 A1 | 1/2014 | Churchman et al. |
| 2014/0051465 A1 | 2/2014 | Ruys et al. |
| 2014/0056526 A1 | 2/2014 | Scipioni |
| 2014/0067488 A1 | 3/2014 | James |
| 2014/0073300 A1 | 3/2014 | Leeder |
| 2014/0082069 A1 | 3/2014 | Varoglu et al. |
| 2014/0129135 A1 | 5/2014 | Holden et al. |
| 2014/0129951 A1 | 5/2014 | Amin |
| 2014/0149157 A1 | 5/2014 | Shaam et al. |
| 2014/0156556 A1 | 6/2014 | Lavian |
| 2014/0172727 A1 | 6/2014 | Abhyanker |
| 2014/0258894 A1 | 9/2014 | Brown |
| 2014/0279668 A1 | 9/2014 | Lievens |
| 2015/0032485 A1 | 1/2015 | Nelson |
| 2015/0324945 A1 | 1/2015 | Ford |
| 2015/0046080 A1 | 2/2015 | Wesselius |
| 2015/0055178 A1 | 2/2015 | Ishibashi |
| 2015/0073645 A1 | 3/2015 | Davidsson |
| 2015/0154810 A1 | 6/2015 | Tew |
| 2015/0161554 A1 | 6/2015 | Sweeney |
| 2015/0161563 A1 | 6/2015 | Mehrabi |
| 2015/0161564 A1 | 6/2015 | Sweeney |
| 2015/0161752 A1 | 6/2015 | Barreto |
| 2015/0176997 A1 | 6/2015 | Pursche |
| 2015/0204684 A1 | 7/2015 | Rostamian |
| 2015/0206267 A1 | 7/2015 | Khanna |
| 2015/0248689 A1 | 9/2015 | Paul |
| 2015/0279217 A1 | 10/2015 | Chen |
| 2015/0323327 A1 | 11/2015 | Ford |
| 2015/0323329 A1 | 11/2015 | Ford |
| 2015/0323330 A1 | 11/2015 | Ford |
| 2015/0323331 A1 | 11/2015 | Ford |
| 2015/0323335 A1 | 11/2015 | Lord |
| 2015/0323336 A1 | 11/2015 | Lord |
| 2015/0324334 A1 | 11/2015 | Ford |
| 2015/0324717 A1 | 11/2015 | Lord |
| 2015/0324718 A1 | 11/2015 | Lord |
| 2015/0324729 A1 | 11/2015 | Lord |
| 2015/0324734 A1 | 11/2015 | Ford |
| 2015/0325158 A1 | 11/2015 | Ford |
| 2015/0339923 A1 | 11/2015 | Konig |
| 2015/0339928 A1 | 11/2015 | Ramanujam |
| 2015/0352128 A1 | 11/2015 | Lord |
| 2015/0345951 A1 | 12/2015 | Dutta |
| 2015/0356803 A1 | 12/2015 | Ellis |
| 2016/0019496 A1 | 1/2016 | Gorlin |
| 2016/0019728 A1 | 1/2016 | Petrie |
| 2016/0026935 A1 | 1/2016 | Botea |
| 2016/0027306 A1 | 1/2016 | Lambert |
| 2016/0034828 A1 | 2/2016 | Sarawgi |
| 2016/0034845 A1 | 2/2016 | Hiyama |
| 2016/0104122 A1 | 4/2016 | Gorlin |
| 2016/0117610 A1 | 4/2016 | Ikeda |
| 2016/0132792 A1 | 5/2016 | Rosnow |
| 2016/0138928 A1 | 5/2016 | Guo |
| 2016/0148167 A1 | 5/2016 | Li |
| 2016/0180346 A1 | 6/2016 | Cheng |
| 2016/0300318 A1 | 10/2016 | Godil |
| 2016/0301698 A1 | 10/2016 | Katara |
| 2016/0334232 A1 | 11/2016 | Zhuang |
| 2016/0364678 A1 | 12/2016 | Cao |
| 2016/0364824 A1 | 12/2016 | Bryant |
| 2016/0370194 A1 | 12/2016 | Colijn |
| 2017/0011324 A1 | 1/2017 | Truong |
| 2017/0115125 A1 | 4/2017 | Outwater |
| 2017/0132540 A1* | 5/2017 | Haparnas ........... G06Q 10/1093 |
| 2017/0138749 A1 | 5/2017 | Pan |
| 2017/0147959 A1 | 5/2017 | Sweeney |
| 2017/0169366 A1 | 6/2017 | Klein |
| 2017/0186126 A1* | 6/2017 | Marco .................... G06Q 50/30 |
| 2017/0192437 A1 | 7/2017 | Bier |
| 2017/0193404 A1 | 7/2017 | Yoo |
| 2017/0200249 A1 | 7/2017 | Ullrich |
| 2017/0240098 A1 | 8/2017 | Sweeney |
| 2017/0255881 A1 | 9/2017 | Ritch |
| 2017/0270794 A1 | 9/2017 | Sweeney |
| 2017/0272901 A1 | 9/2017 | Sweeney |
| 2017/0300848 A1 | 10/2017 | Shoval |
| 2017/0308824 A1 | 10/2017 | Lord |
| 2018/0003843 A1 | 1/2018 | Hori et al. |
| 2018/0071634 A1 | 3/2018 | Carvallo |
| 2018/0081496 A1 | 3/2018 | Bhardwaj |
| 2018/0091603 A1 | 3/2018 | Nickels |
| 2018/0101925 A1 | 4/2018 | Brinig |
| 2018/0102017 A1 | 4/2018 | Brinig |
| 2018/0180426 A1 | 6/2018 | Pan |
| 2018/0268329 A1 | 9/2018 | Lord |
| 2018/0293521 A1 | 10/2018 | Akselrod |
| 2018/0315148 A1 | 11/2018 | Luo |
| 2018/0349825 A1 | 12/2018 | Yamamoto |
| 2018/0374350 A1 | 12/2018 | Sweeney |
| 2019/0035202 A1 | 1/2019 | Brinig |
| 2019/0095849 A1 | 3/2019 | Sweeney |
| 2019/0109910 A1 | 4/2019 | Sweeney |
| 2019/0172353 A1 | 6/2019 | Chen |
| 2019/0205812 A1 | 7/2019 | Afzal |
| 2019/0206009 A1 | 7/2019 | Gibson |
| 2019/0212157 A1 | 7/2019 | Wu |
| 2019/0221069 A1 | 7/2019 | Brinig |
| 2019/0340554 A1 | 11/2019 | Jaffe |
| 2019/0347754 A1 | 11/2019 | Dicker |
| 2020/0013020 A1 | 1/2020 | Yang |
| 2020/0145503 A1 | 5/2020 | Sweeney |
| 2020/0173979 A1 | 6/2020 | Nickels |
| 2020/0175429 A1 | 6/2020 | Beaurepaire |
| 2021/0097452 A1 | 4/2021 | Niemiec |
| 2021/0152652 A1 | 5/2021 | Barreto |
| 2021/0121446 A1 | 7/2021 | Pan |
| 2021/0223051 A1 | 7/2021 | Hochberg |
| 2021/0227049 A1 | 7/2021 | Demilrap |
| 2021/0256649 A1 | 8/2021 | Stumpf |
| 2021/0256794 A1 | 8/2021 | Brinig |
| 2021/0319380 A1 | 10/2021 | Camp |
| 2022/0006870 A1 | 1/2022 | Sweeney |
| 2022/0215499 A1 | 7/2022 | Dicker |
| 2022/0329670 A1 | 10/2022 | Barreto |

FOREIGN PATENT DOCUMENTS

| | | |
|---|---|---|
| CN | 105575103 | 5/2016 |
| CN | 106651728 | 5/2017 |
| CN | 111832788 | 10/2020 |
| EP | 3046058 | 7/2016 |
| JP | 2002-133592 | 5/2002 |
| JP | 2002-0133592 | 5/2002 |
| JP | 2004-302941 | 10/2004 |
| JP | 2004-302942 | 10/2004 |
| JP | 2004-362271 | 12/2004 |
| JP | 2005-0107942 | 4/2005 |
| JP | 2005-107942 | 4/2005 |
| JP | 2006-339810 | 12/2006 |
| JP | 2006-0339810 | 12/2006 |
| JP | 3934985 | 6/2007 |
| JP | 2014-130552 | 6/2014 |
| JP | 2014-238831 | 12/2014 |
| JP | 2004-073639 | 5/2015 |
| KR | 10-2010-0053717 | 5/2010 |
| KR | 10-2014-0124137 | 10/2014 |

(56) References Cited

FOREIGN PATENT DOCUMENTS

| KR | 10-2015-0045962 | 4/2015 |
|---|---|---|
| WO | WO 1999/044186 | 2/1999 |
| WO | WO 1999044186 | 9/1999 |
| WO | WO 2005/013588 | 2/2005 |
| WO | WO 20110067741 | 6/2011 |
| WO | WO 20110069170 | 6/2011 |
| WO | WO 2011-120161 | 10/2011 |
| WO | WO 2014106617 | 7/2014 |
| WO | WO 2017/079222 | 5/2017 |

OTHER PUBLICATIONS

Hai Yang et al. "Equilibria of bilateral taxi-customer searching and meeting on networks", Transportation Research Part B., 2010, vol. 44, pp. 1067-1083.
International Search Report in PCT/US2015/034831 dated Sep. 24, 2015.
International Search Report in PCT/US2015/043654 dated Nov. 26, 2015.
International Search report in PCT/US2016/016858 dated May 19, 2016.
IPRP in PCT/US2014/069602 dated Jun. 14, 2016.
Alfred Round, et al.: Future Ride: Adapting New Technologies to Paratransit in the United States, UC Transportation Center Berkeley, CA, UCTC No. 306 (1996).
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
International Search Report and Written Opinion issued in PCT/US2016/062344 dated Jan. 31, 2017.
Extended Search Report issued in EP 14869805.3 dated May 10, 2017.
Extended Search Report issued in EP 15826507.1 dated Nov. 10, 2017.
International Search Report in PCT/US2017/053065 dated Sep. 22, 2017.
Written Opinion issued in SG 11201700669R dated Dec. 5, 2017.
Robert Kuhlthau and Ira D. Jacobson, The Development of a Model for Predicting Passenger Acceptance of Short Haul Air Transportation Systems, NASA, Sep. 1977.
Xing Wang, Optimizing Ride Matches for Dynamic Ride Sharing Systems, GIT, May 2013.
International Search Report issued in PCT/US2017/053065 dated Dec. 13, 2017.
First Examination Report in EP 14869806.3 dated May 4, 2018.
Aloizio P. Silva, A Mobile Location-Based Vehicle Fleet Management Service Application, 0-7803-78482/03 2003, IEEE.
Andersson, Magnus, Peer-to-Peer Service Sharing Platforms: Driving Share and Share Alike on a Mass-Scale, Thirty Fourth International Conference on Information Systems, Milan 2013, pp. 1-15 (2013).
First Office Action in CN 2014800731753 dated Feb. 3, 2019.
Examination Reported in AU 2017342747 dated Apr. 8, 2019.
Office Action in EP 15826501.7 dated May 14, 2019.
EESR in EP 17859424.8 dated Aug. 5, 2019.
ISR and Written Opinion in PCT/US2018/055256 dated Jan. 30, 2019.
How to request multiple Uber vehicles, Aug. 15, 2013 (https://www.wikihow.com/ Request-Multiple-Uber-Vehicles.
How to book two cabs at the same time in Uber, Jun. 30, 2017 (https://fastandclean.org/ book-two-cabs-time-uber).
Is it possible to order 2 Ubers at the same time, Jul. 13, 2015 (https://web.archive.org/web/20150801000000*/https://android.Stackexchange.com/questions/114027/is-it- possible-to-order-2-ubers-at-the-same-time.
Written Opinion in PCT/US2018/055256 dated Jul. 19, 2019.
Examination Report No. 1 in AU 2014362392 dated Sep. 10, 2019.
Examination Report No. 1 in AU 2014362378 dated Sep. 18, 2019.
Exam Report No. 2 in AU 2017/342747 dated Aug. 27, 2019.
Second Office Action in CN 2014800731753 dated Sep. 27, 2019.
ISR and Written Opinion dated Apr. 30, 2019 in PCT/US2019/012902.
ISR and Written Opinion in PCT/US2017/023350 dated Jun. 29, 2017.
ISR and Written Opinion in PCT/US2017/023343 dated Jul. 6, 2017.
EESR in EP 17771000.1 dated Mar. 21, 2019.
Office Action dated Apr. 16, 2020 in EP 1670690.0.
Exam Report No. 1 in AU 2015296265 dated Apr. 21, 2020.
Office Action in JP 2018-524399 dated Apr. 8, 2020.
Office Action in BR 1120170017768 dated May 6, 2020.
Exam Report No. 2 in AU 2014362378 dated May 7, 2020.
Office Action in BR 1120180097799 dated Aug. 27, 2020.
Office Action in CA 2,932,828 dated Feb. 8, 2021.
Office Action in BR 1220200245654 dated Feb. 4, 2021.
Office Action in CA 2,956,631 dated May 7, 2021.
ISR and Written Opinion in PCT/US2021/013677 dated Jun. 16, 2021.
Furuhata, M., "Ridesharing" The State-of-the-Art and Future Directions, Apr. 15, 2013, Elsevier Ltd., Transportation Research Part B 57, pp. 28-46 (2013).
Huang, Y., Large Scale Real-time Ridesharing with Service Guarantee on Road Networks, Sep. 1-5, 2014, VLDB Endowment, vol. 7, No. 14, pp. 2017-2018 (2014).
Mukai, Dynamic Location Management for On-Demand Car Sharing System, 2005, In: Khosia R., Howlett R.J., Jain L.C. (eds) Knowledge-Based Intelligent Information and Engineering Systems, KES 2005. Lecture Notes in Computer Science, vol. 3681. Springer, Berlin, Heidelberg, pp. 768-744 (2005).
How does Uber Work? available at https://help.uber.com/h/738d1ff7-5fe0-4383-b34c-4a2480efd71e (Year: 2016).

* cited by examiner

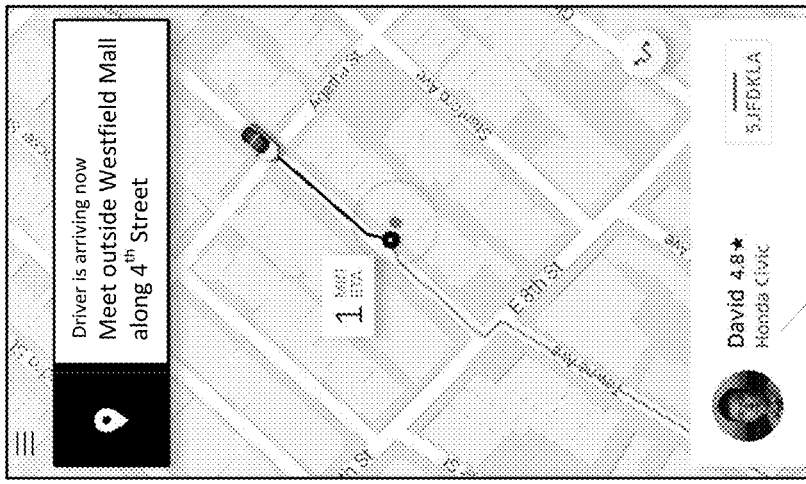
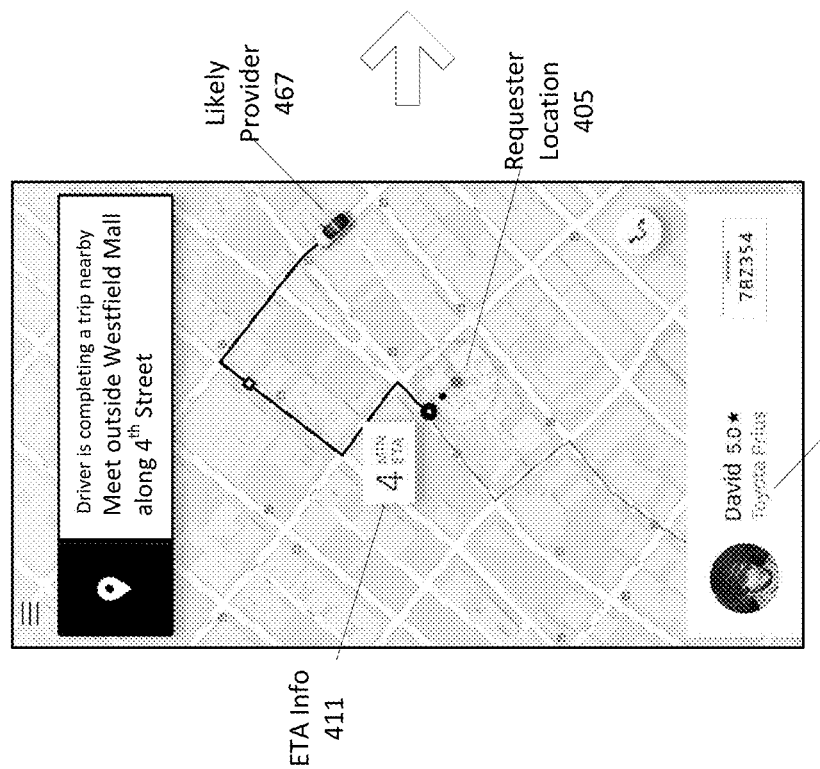
FIG. 4E
FIG. 4D

NETWORK SYSTEM FOR PRESELECTING A SERVICE PROVIDER BASED ON PREDICTIVE INFORMATION

RELATED APPLICATIONS

This application is a continuation of U.S. patent application Ser. No. 16/787,601, filed on Feb. 11, 2020; which is a continuation of U.S. patent application Ser. No. 15/707,482, filed on Sep. 18, 2017, now U.S. Pat. No. 10,571,286; which is a continuation of U.S. patent application Ser. No. 15/395,818, filed on Dec. 30, 2016, now U.S. Pat. No. 9,813,510, which claims the benefit of U.S. Provisional Application No. 62/399,793, filed Sep. 26, 2016; the aforementioned applications being hereby incorporated by reference in their entireties.

BACKGROUND

User-centric network services typically sequence users through a number of selection interfaces so that the user can specify certain information for a desired type of service, including service level selections and preferences. With enhancements in network and mobile technology, the number of services for user selection is also increasing, creating inconvenience for human operators. Moreover, the time needed for selection can occupy an interface device, creating performance issues and draining resources of the operative selection device.

BRIEF DESCRIPTION OF THE DRAWINGS

FIGS. 4A-4E illustrate example user interfaces on a service requester device, according to examples described herein.

DETAILED DESCRIPTION

Figure 1:
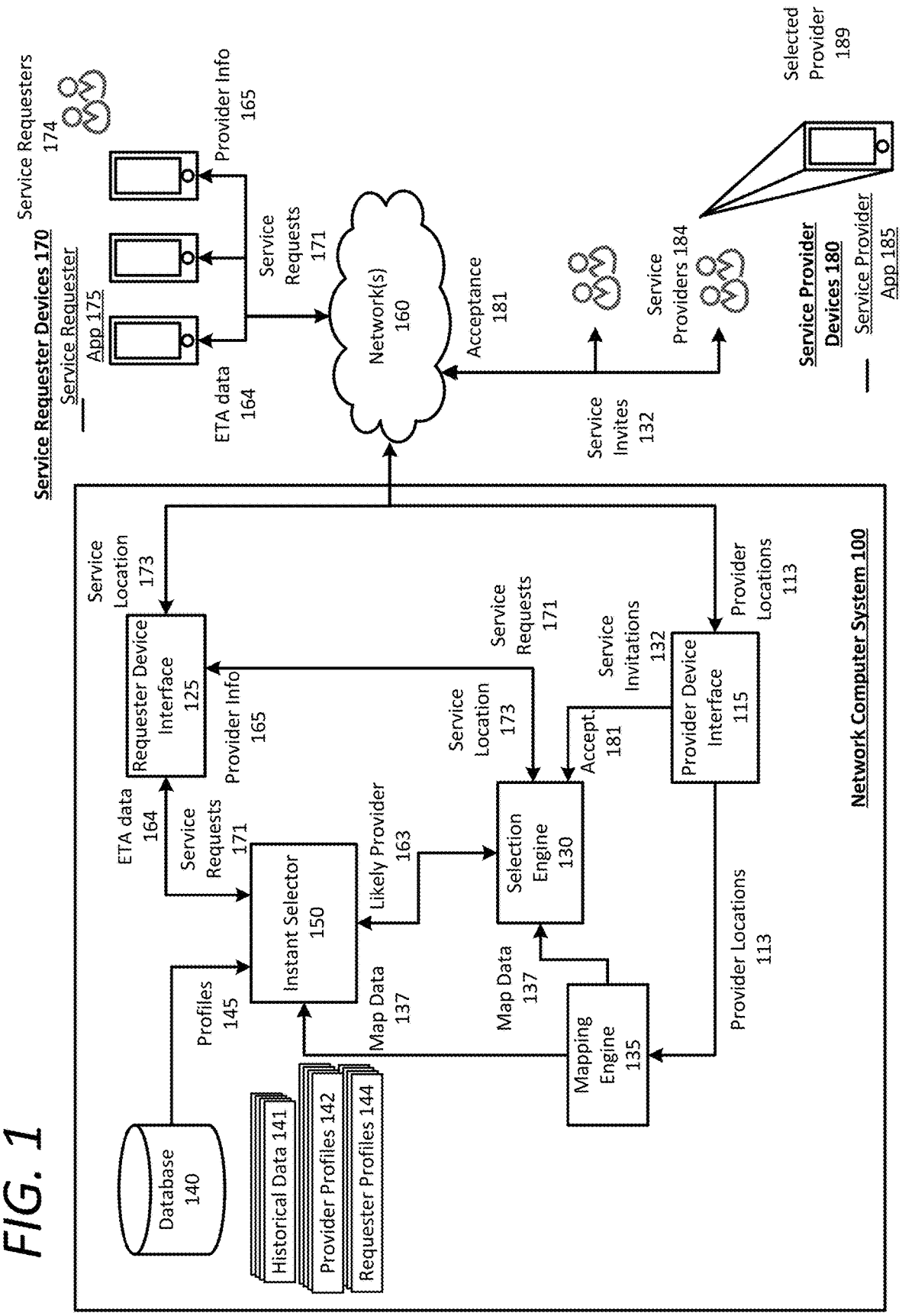
FIG. 1 is a block diagram illustrating an example network computer system in communication with service requester and service provider devices, in accordance with examples described herein.

A network computer system is provided herein that manages an on-demand network-based service linking available service providers with service requesters throughout a given region (e.g., a metroplex such as the San Francisco Bay Area). In doing so, the network computer system can receive service requests for on-demand services (e.g., transport service or delivery service) from requesting users (e.g., a rider) via a designated service requester application executing on the users' mobile computing devices. Based on a service location, the network computer system can identify a number of proximate available service providers (e.g., a driver) and transmit a service invitation to one or more service provider devices of the proximate available service providers to fulfil the service request. In many examples, the service providers can either accept or decline the invitation based on, for example, the service location being impractical for the service provider.

In selecting a service provider to fulfil a given service request, the network computer system can identify a plurality of candidate service providers to fulfil the service request based on a service location indicated in the service request. For example, the network computer system can determine a geo-fence surrounding the service location (or a geo-fence defined by a radius away from the service location), identify a set of candidate service providers (e.g., twenty or thirty service providers within the geo-fence), and select an optimal service provider (e.g., closest service provider to the service location, service provider with the shortest estimated travel time from the service location, service provider traveling to a location within a specified distance or specified travel time to the destination location, etc.) from the candidate service providers to fulfil the service request. According to examples provided herein, the network computer system can compile historical data for individual service requesters with regard to the network-based service. Thus, the network computer system can manage a service requester profile for each service requester indicating routine start and/or end locations (or regions), and/or routine routes (e.g., for a transportation service from home to work and/or vice versa) and preferred service types (e.g., transportation, delivery, mailing, etc.). In some examples, the network computer system can further synchronize with a service requester device to, for example, identify the service requester's contacts, the service requester's schedule and appointments, travel plans (e.g., a scheduled trip), and the like.

In various implementations, the network computer system can determine whether to display, before actually receiving an acceptance (of an invitation message to provide service) from a service provider, information about a likely service provider (or information that a service provider is likely to accept an invitation message) to provide on-demand services in response to a user making a service request through a service requester application. For example, the network computer system can predetermine a likely service provider or number of matching service providers and display this information to the user in lieu of a "requesting" screen (e.g., a user interface that indicates to the service requester that a provider is being located or selected).

In conventional service requester applications used with on-demand service systems, once a service requester makes a request for service (e.g., the request is sent to the network computer system), the service requester waits at a "requesting" screen while the network computer system performs a selection operation to identify a service provider from one or more candidate service providers. The requesting screen typically transitions to an en route screen with the service provider's specific information once that service provider has accepted the invitation to provide the service. Meanwhile, a substantial portion of service requester cancellations occur while service requesters are waiting on the requesting screen. Examples described herein can remove the requesting screen altogether (or reduce the amount of time the requesting screen is displayed) and/or immediately let service requesters know that a service provider is on the way with a promised estimated time to arrival (ETA) before the network computer system has committed to and locked in the exact service provider to fulfil the user request.

Among other benefits, decoupling the service requester matching experience from the service provider acceptance simplifies the user experience to a fire-and-forget scenario where users are immediately told where to go and when they can expect a service provider to show up. Users can proceed to the service location with ETA expectations already finalized rather than staring at an opaque request screen indefinitely waiting for request assignment confirmation, thereby reducing service cancellations. In addition, in some examples, decoupling extends the matching window so that the system can find an optimal service provider and effectively allows the system to "steal time." That is, instead of forcing the service requester to wait while the system figures out the service provider situation, the service provider selection decision can be moved either up in service requester funnel time (pre-selecting in high service requester intent or low liquidity scenarios) or down in service requester funnel time (delaying the finalization of the candidate when the system detects a high probability that a better candidate will become available).

As provided herein, the terms "user" and "service requester" may be used throughout this application interchangeably to describe a person who utilizes a requester application on a computing device to request, over one or more networks, on-demand services from a network computing system. The term "service provider" may be used to describe a person or autonomous entity (e.g., an autonomous vehicle) utilizing a provider application on a computing device to provide on-demand services.

According to examples described herein, a network computer system server receives a request for service from a computing device of a user. In response to receiving the request for service, the server determines a plurality of service providers that are capable of providing service for the user. Based on a distance or estimated travel time of at least some of the plurality of service providers from a selected service location near the user, the server (1) determines an estimated time to arrival at the service location, and (2) transmits, to be displayed on the computing device of the user, the estimated time to arrival and an indication that one of the plurality of service providers is en route or traveling to the service location, wherein the indication is transmitted prior to selecting which of the plurality of service providers will provide service for the user, and selects a service provider from the plurality of service providers to provide service for the user.

In variations, information regarding one of the plurality of service providers is displayed on the computing device of the user prior to selecting the service provider, and the information indicates which of the plurality of service providers is most likely to be selected. In other variations, information regarding the service provider is not displayed on the computing device until the service provider is selected.

In some examples, the estimated time to arrival at the service location is periodically determined while a service requester application executing on the computing device of the user is active. In further examples, the request for service is automatically sent from the computing device of the user upon activating a service requester application, wherein the request for service is automatically sent based on a service requester profile for the user indicating that the user is likely to request service through the service requester application.

Furthermore, in one example, the indication that one of the plurality of service providers is en route to the service location can be transmitted to the computing device only upon determining that one of the plurality of service providers is likely to accept the request to provide service and arrive within a threshold of time from the estimated time to arrival at the service location. Additionally, determining the estimated time to arrival at the service location can take into account historical data regarding on-demand services near the service location including possibilities that service providers other than the plurality of service providers capable of providing service for the user may be available to reach the service location within the estimated time to arrival.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 is a block diagram illustrating an example network computer system in communication with service requester and service provider devices, in accordance with examples described herein. The network computer system 100 can implement or manage an on-demand arrangement service that connects requesting users or service requesters 174 with service providers 184 that are available to fulfil the users' 174 service requests 171. The on-demand arrangement service can provide a platform that enables sharing services between service requesters 174 and available service providers 184 by way of a service requester application 175 executing on the service requester devices 170, and a service provider application 185 executing on the service provider devices 180. As used herein, a service requester device 170 and a service provider device 180 can comprise a computing device with functionality to execute a designated application corresponding to the on-demand arrangement service managed by the network computer system 100. In many examples, the service requester device 170 and the service provider device 180 can comprise mobile computing devices, such as smartphones, tablet computers, VR or AR headsets, on-board computing systems of vehicles, and the like. Example on-demand network-based services can comprise on-demand delivery, package mailing, shopping, construction, plumbing, home repair, housing or apartment sharing, etc., or can include transportation arrangement services implementing a ride sharing platform.

The network computer system 100 can include a service requester device interface 125 to communicate with service requester devices 170 over one or more networks 160 via a service requester application 175. According to examples, a service requester 174 wishing to utilize the on-demand arrangement service can launch the service requester application 175 and transmit a service request 171 over the network 160 to the network computer system 100. In certain implementations, the requesting service requester 174 can view multiple different service types managed by the network computer system 100, such as ride-pooling, a basic ride share service type, a luxury vehicle service type, a van or large vehicle service type, a professional service provider service (e.g., where the service provider is certified), a self-driving vehicle on-demand service, and the like. The network computer system 100 can utilize the service provider locations 113 to provide the service requester devices 170 with ETA data 164 of proximate service providers for each respective service. For example, the service requester application 175 can enable the service requester 174 to scroll through each service type. In response to a soft selection of a particular service type, the network computer system 100 can provide ETA data 164 on a user interface of the service requester application 175 that indicates an ETA of the closest service provider 184 for the service type, and/or the locations of all proximate available service providers 184 for that service type. As the service requester 174 scrolls through each service type, the user interface can update to show visual representations of the service providers 184 for that service type on a map centered on the service requester 174 or a chosen service location 173. The service requester 174 can interact with the user interface of the service requester application 175 to select a particular service type and transmit a service request 171.

In some examples, the service request 171 can include a service location 173 within a given region (e.g., a metropolitan area managed by one or more datacenters corresponding to the network computer system 100) in which a matched service provider is to rendezvous with the service requester 174. The service location 173 can be inputted by the user by setting a location pin on a user interface of the service requester application 175, or can be determined by a current location of the service requester 174 (e.g., utilizing location-based resources of the service requester device 170). Additionally, the service requester 174 can further input a destination during or after submitting the service request 171.

In various implementations, the network computer system 100 can further include a selection engine 130 to process the service requests 171 in order to ultimately select service providers 184 to fulfil the service requests 171. The network computer system 100 can include a service provider device interface 115 to communicate with the service provider devices 180 via the service provider application 185. In accordance with various examples, the service provider devices 180 can transmit their current locations using location-based resources of the service provider devices 180 (e.g., GPS resources). These service provider locations 113 can be utilized by the selection engine 130 to identify a set of candidate service providers 184, in relation to the service location 173, that can service the service request 171.

In certain implementations, the network computer system 100 can also select a proximate autonomous entity (e.g., a self-driving vehicle (SDV)) to fulfil the service request 171. Thus, the pool of proximate candidate service providers 184 in relation to a service location 173 can also include one or more SDVs operating throughout the given region.

In some aspects, the network computer system 100 can include a mapping engine 135, or can utilize a third-party mapping service, to generate map data 137 and or traffic data in the environment surrounding the service location 173. The mapping engine 135 can receive the service provider locations 113 and input them onto the map data 137. The selection engine 130 can utilize the current locations 113 of the service providers in the map data 137 (e.g., by setting a geo-fence surrounding the service location 173) in order to select an optimal service provider 189 to fulfil the service request 171. As provided herein, the optimal service provider 189 can be a service provider that is closest to the service requester 174 with respect to distance or time, or can be a proximate service provider that is optimal for other reasons, such as the service provider's experience, the amount of time the service provider has been on the clock, the service provider's current earnings, and the like.

Once the optimal service provider 189 is selected, the selection engine 130 can generate a service invitation 132 to fulfil the service request 171, and transmit the service invitation 132 to the optimal service provider's device via the service provider application 185. Upon receiving the service invitation 132, the optimal service provider 189 can either accept or reject the invitation 132. Rejection of the invitation 132 can cause the selection engine 130 to determine another optimal service provider from the candidate set of service providers 184 to fulfil the service request 171. However, if the optimal service provider accepts (e.g., via an acceptance input), then the acceptance input can be transmitted back to the selection engine 130, which can generate and transmit a confirmation of the optimal service provider 189 to the service requester 174 via the service requester application 175 on the service requester device 170.

According to examples provided herein, the network computer system 100 can include a content engine that manages the manner in which content is displayed on the service requester devices 170 and/or the service provider devices 180. Regarding the service requester devices 170, the content engine can provide content updates based on user inputs 179 on a user interface generated by the service requester application 175. For example, a user selection on a content feature of the service requester application 175 can cause the content engine to generate a new screen on the service requester application 175, or cause a current screen to pivot between certain displayed features. When inputting a particular service location 173, the user may utilize a location pin and map content, and set the location pin on a particular location in the map content to input the service location 173. Additionally, the content engine can cause a service location input box to overlay the map content, which can enable the service requester 174 to select the input box to cause additional features to be displayed on the user interface (e.g., overlaying the map content). In variations, to return to the map content, the service requester 174 can input a gesture—such as a scroll or swipe gesture—anywhere on the screen. In response to the gesture, the content engine can cause the additional features to dismiss, and re-enable map content scrolling with the location pin. These dynamically pivoting interfaces can be provided by the content engine for the service location input, the destination location input, or both.

In various implementations, the network computer system 100 can further include a database 140 storing service requester profiles 144 specific to the individual users 174 of the on-demand service. Such information can include user preferences of service types, routine routes, service locations 173, and destinations, work addresses, home addresses, addresses of frequently visited locations (e.g., a gym, grocery store, mall, local airport, sports arena or stadium, concert venue, local parks, and the like). In addition, the database 140 can further store service provider profiles 142 indicating information specific to individual service providers, such as vehicle type, service qualifications, earnings data, and service provider experience. Database 140 can also store historical data 141 regarding service requester and service provider liquidity for a given area, that is, how often a new service provider 184 is expected to make themselves available for on-demand services in the area.

In some aspects, network computer system 100 includes an instant selector 150 to streamline the selection process of connecting a service requester 174 to one of the service providers 184. When a service requester 174 submits a service request 171 through the service requester application 175, instant selector 150 can transmit service provider information 165 for one of the service providers 184 back to the service requester device 170 prior to the selection engine 130 receiving an acceptance 181 or sending a service invite 132 to the service providers 184. The service requester application 175 can then inform the service requester 174 that a service provider is en route with an estimated time to arrival contained in the ETA data 164. In some examples, the service provider information 165 is a number of possible service providers 184 that the network computer system 100 is attempting to match with the service requester 174. In other examples, the service provider information 165 can include details (e.g., a picture and license plate number) for one of the service providers 184 deemed likely to accept the service request 171, and if the selected service provider 189 is ultimately different from the likely service provider 163, the service requester application 175 can swap the service provider information 165 with information for the selected service provider 189 prior to arrival at the service location 173.

In some implementations, instant selector 150 is active when the state of supply of service providers 184 in an area is liquid enough that the network computer system 100 can make an estimated time to arrival and fulfillment promise with high accuracy. In one example, high accuracy may be determined by a 90% confidence in the ETA data 164 being within a threshold of one minute, although the confidence requirements and thresholds can change and depend on factors such as time and location of the service request 171. Instant selector 150 can use profiles 145 from the database 140 in order to determine levels of confidence in the ETA data 164 and probabilities of the service request going unfulfilled. In some aspects, the service provider profiles 142 can include information regarding how often individual service providers 184 accept or decline service invites 132. Instant selector 150 can use this information combined with the number of service providers 184 in the area and historical data 141 to determine whether one of the service providers 184 is likely to accept the service request 171.

To aid in issuing instant selections, the network computer system 100 can issue a "ghost selection" when a service requester 174 opens the service requester application 175 and periodically during programmed time intervals while the service requester application 175 is active (e.g., every 20 seconds). In these ghost selections, instant selector 150 determines whether an instant selection that meets the acceptable service thresholds is possible. If so, selection engine 130 can use the map data 137 with service provider locations 113 and service location 173 to generate ETA data 164 and find the optimal service provider among service providers 184 to respond to a potential service request 171. This optimal service provider is the likely service provider 163 that would accept a service invite 132 to provide service to the service requester 174. Instant selector 150 can send the ETA data 164 and likely service provider 163 to the service requester device 170 so that as soon a service requester 174 issues a service request 171, the service requester application 175 can display the estimated time to arrival and service provider information 165 for the likely service provider 163 without waiting for a response from the network computer system 100. In this situation, service requester application 175 can transition straight from the "request" button press to an en route map screen. In another example, the service requester application 175 can display a "matching" transition screen in response to the "request" button that displays the service provider information 165 as a number of service providers 184 available to respond to the service request 171.

Once the service requester 174 makes the service request 171, network computer system 100 transmits a service invite 132 to the likely service provider 163. If this service provider accepts, likely service provider 163 becomes the selected service provider 189. In examples where the service provider information 165 displays the likely service provider 163, network computer system 100 can send a push notification to service requester device 170 to confirm that the displayed service provider is the selected service provider 189. In examples using the "matching" transition screen, the push notification can trigger the service requester application 175 to transition to a screen showing information for the selected service provider 189.

If the likely service provider 163 declines the service invite 132 or is otherwise unavailable to accept the service request 171, selection engine 130 chooses an alternate among service providers 184. Once one of these alternates accepts the service invite 132, network computer system 100 can update the service provider information 165 so that the service requester application 175 displays information for the selected service provider 189. In some examples, service requester application 175 can inform the service requester 174 of the change from the likely service provider 163 to selected service provider 189 with a notification, pop-up window, or other audiovisual cue.

In some aspects, an instant selector 150 can take advantage of historical data 141 to provide more accurate ETA data 164. For example, during a ghost selection, instant selector 150 may determine that the closest service provider 184 is 8 minutes away from a service requester 174. However, the historical data 141 may indicate that a new service provider is predicted to activate the service provider application 185 and be available to accept a service invite 132 and respond to a service request 171 from the service requester 174 within 3 minutes. In such a scenario, the instant selector 150 can report an ETA of 3 minutes. In further aspects, the instant selector 150 can track service providers 184 who are currently providing services to others but can complete those services and arrive at a service location 173 for service requester 174 before other service providers 184.

In one implementation, the instant selector 150 can trigger a service invite 132 to provide service to the service requester 174 without him or her manually making a request through the service requester application 175. Using service requester profiles 144, the instant selector 150 can determine whether the likelihood of the service requester 174 requesting service exceeds a necessary threshold (e.g., 90% likelihood) to automatically send a service provider to a service location 173 (e.g., the current location of service requester 174). Instant selector 150 can analyze profile details such as dates, times, and locations when service requester 174 requested rides in the past and the user's activity profile with the service requester application 175, among other details. For example, if service requester 174 issues a service request 171 every Monday at 8 AM, instant selector 150 can transmit a service invite 132 automatically upon detecting that service requester 174 activates the service requester application 175 on a Monday slightly before 8 AM. In some aspects, this programmatic service request 171 can trigger the service requester application 175 to notify the service requester 174 of the instant selection and provide a cancellation option. Instant selector 150 can also take into account the liquidity of service providers 184 in the area when determining the threshold likelihood required to automatically send a service provider to service requester 174. Instant selector 150 can choose the service location 173 for the automatic selection from the service requester profile 144 or from the map data 137.

Figure 2:
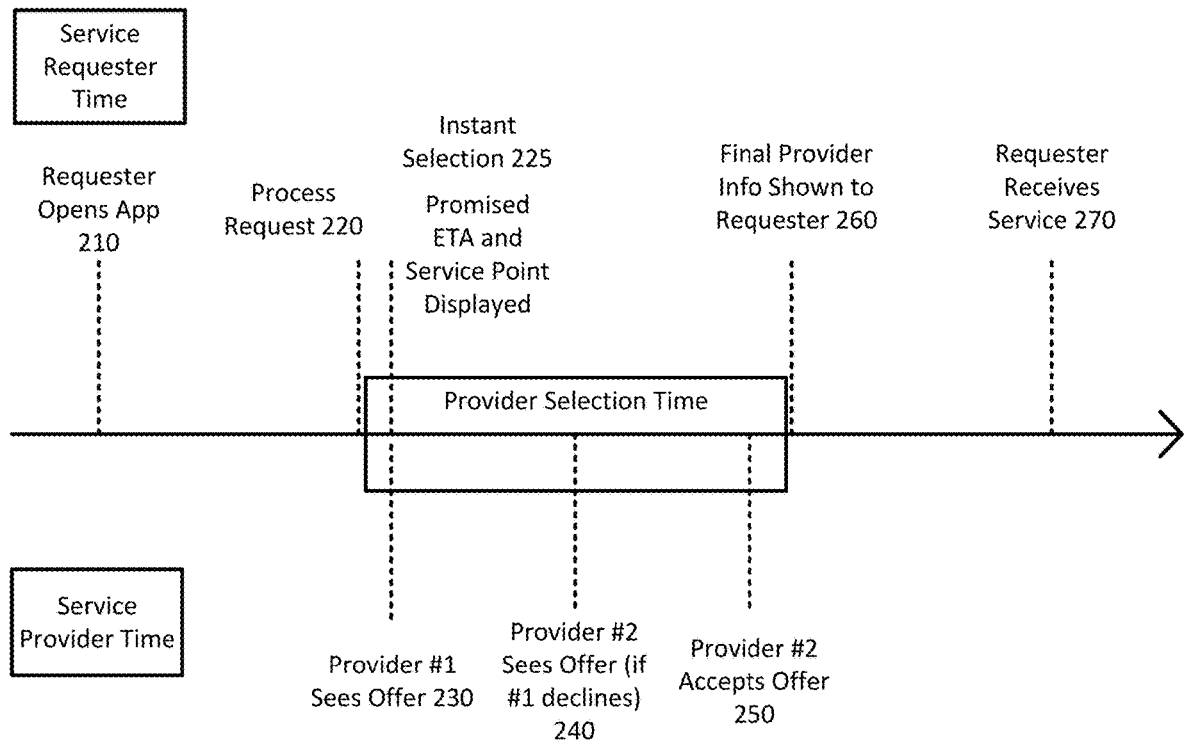
FIG. 2 is a timeline illustrating examples of events that can occur during an instant service provider selection procedure, in accordance with examples described herein.

FIG. 2 is a timeline illustrating examples of events that can occur during an instant selection procedure, in accordance with examples described herein. Events above the timeline are performed by or on behalf of the service requester, while events below the timeline are performed by or on behalf of the service provider.

At the start of the timeline, a service requester opens a service requester application on a device (210). The service requester can navigate various menus and functions of the service requester application in order to make a request for service at a selected location, choosing from among an offering of services. A network computer system such as the one described in FIG. 1 receives and processes the request for service, which marks the start of the service provider selection time on the timeline (220).

In an instant service provider selection environment, the service requester matching experience is decoupled from the service provider accept event. In some implementations, instant selection is active when the state of supply of service providers in an area is liquid enough that the network computer system can make an estimated time to arrival and fulfillment promise with high accuracy. In one example, high accuracy may be determined by a 90% confidence in the ETA data being within a threshold of one minute, although the confidence requirements and thresholds can change and depend on factors such as time and location of the service request. When instant selection is active, rather than displaying a requesting screen and forcing the service requester to wait until a service provider accepts, instant selection removes the requesting screen altogether and immediately lets service requesters know that their request is fulfilled with a promised ETA before the system has committed to and locked in the exact service provider (225). In some examples, the service requester application can also display service provider information for the most likely service provider to accept and provide service to the service requester. In other examples, the service requester application can display an indication that multiple service providers are being matched.

Meanwhile, the network computer system shows the offer to service the service requester to a first service provider determined to be the optimal service provider (230). If the first service provider declines, the network computer system chooses a second service provider to provide service instead (240). This can occur multiple times until a service provider accepts the offer (250).

Once a service provider has accepted, the network computer system sends the service provider information to the service requester application where it is shown to the service requester (260). This marks the end of the service provider selection time. In examples where a likely service provider was shown on the service requester application, the application can inform the user of the change from the likely service provider #1 to the selected service provider #2 with a notification, pop-up window, or other audiovisual cue. In examples where a matching screen is used, the service requester application can replace the matching window with the service provider information and display a notification that the service provider will arrive in a certain period of time. As long as neither service requester nor service provider cancels, the service provider should arrive to provide service to the service requester (270).

Methodology

Figure 3:
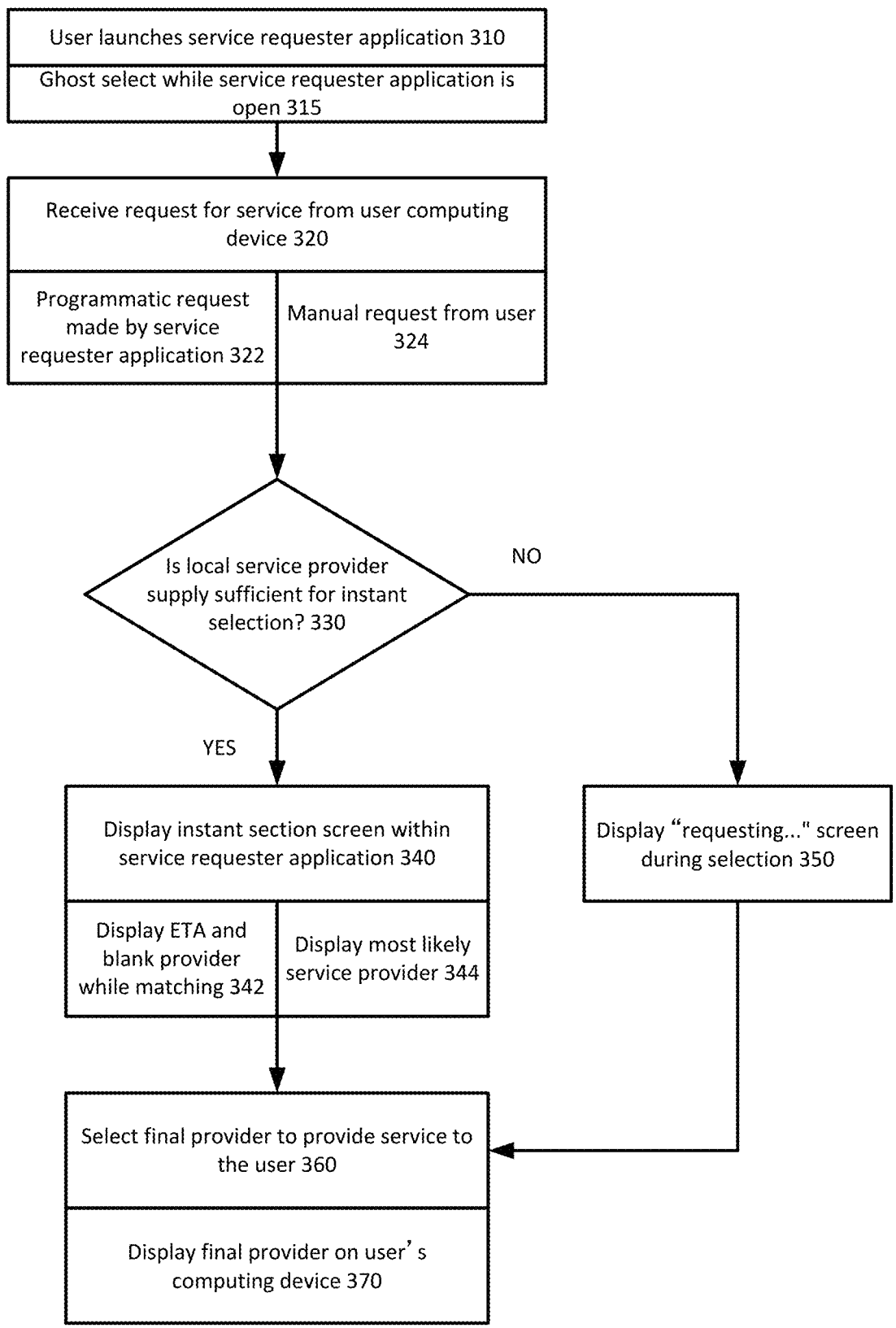
FIG. 3 is a flow chart describing an example method of instant service provider selection, according to examples described herein.

FIG. 3 is a flow chart describing an example method of instant selection, according to examples described herein. While operations of the method are described below as being performed by specific components of the network computer system 100, it will be appreciated that these operations need not necessarily be performed by the specific components identified, and could be performed by a variety of components and modules, potentially distributed over a number of machines. Accordingly, references may be made to elements of network computer system 100 for the purpose of illustrating suitable components or elements for performing a step or sub step being described. Alternatively, at least certain ones of the variety of components and modules described in network computer system 100 can be arranged within a single hardware, software, or firmware component. It will also be appreciated that some of the steps of this method may be performed in parallel or in a different order than illustrated.

With reference to an example of FIG. 3, a service requester 174 launches a service requester application 175 on a device, which contacts a network computer system 100 as described with FIG. 1 (310). To aid in issuing instant selections, the network computer system 100 can issue a "ghost selection" when a service requester 174 opens the service requester application 175 and periodically during programmed time intervals while the service requester application 175 is active (e.g., every 20 seconds) (315).

The network computer system 100 receives a service request 171 from the service requester device 170 (320). In one implementation, instant selector 150 can trigger a service invite 132 to provide service to the service requester 174 without the user manually requesting service (322). Using service requester profiles 144, the instant selector 150 can determine whether the likelihood of the service requester 174 requesting service exceeds a necessary threshold (e.g., 90% likelihood) to automatically send a service provider to the user's location. The instant selector 150 can analyze profile details such as dates, times, and locations when the service requester 174 requested rides in the past and the user's activity profile with the service requester application 175, among other details.

In some examples, the user manually submits the request for on-demand services (324). The service request 171 can include a service location 173 within a given region in which a matched service provider is to rendezvous with the service requester 174. The service location 173 can be inputted by the user by setting a location pin on a user interface of the service requester application 175, or can be determined by a current location of the service requester 174 (e.g., utilizing location-based resources of the service requester device 170).

Through the ghost selections, instant selector 150 determines whether the local service provider supply and likelihood of accepting the request from the user meet the acceptable service thresholds (330). If so, selection engine 130 can use the map data 137 with service provider locations 113 and service location 173 to generate ETA data 164 and find the optimal service provider among service providers 184 to respond to a potential service request 171. This optimal service provider is the likely service provider 163 that would accept a service invite 132 to provide service to the service requester 174.

The instant selector 150 can send the ETA data 164 and likely service provider 163 to the service requester device 170 so that as soon a service requester 174 issues a service request 171, the service requester application 175 can display an instant selection screen without waiting for a response from the network computer system 100 (340). In one example, the service requester application 175 can display a "matching" transition screen in response to the "request" button that displays the ETA and a number of service providers 184 available to respond to the service request 171 (342). In other examples, service requester application 175 can transition straight from the "request" button press to an en route map screen displaying the most likely service provider (344).

If the instant selector 150 determines that the local service provider supply is insufficient to ensure a high likelihood of fulfilling the request for service within the ETA, the service requester application 175 can display a standard "requesting" screen and wait for the network computer system 100 to select a service provider (350).

Network computer system 100 transmits a service invite 132 to the likely service provider 163. If this service provider accepts, likely service provider 163 becomes the selected service provider 189 (360). In examples where the service provider information 165 displays the likely service provider 163, network computer system 100 can send a push notification to service requester device 170 to confirm that the displayed service provider is the selected service provider 189. In examples using the "matching" transition screen, the push notification can trigger the service requester application 175 to transition to a screen showing information for the selected service provider 189 (370). If the likely service provider 163 declines the service invite 132 or is otherwise unavailable to accept the service request 171, selection engine 130 chooses an alternate among service providers 184. Once one of these alternates accepts the service invite 132, network computer system 100 can update the service provider information 165 so that the service requester application 175 displays information for the selected service provider 189. In some examples, service requester application 175 can inform the service requester 174 of the change from the likely service provider 163 to selected service provider 189 with a notification, pop-up window, or other audiovisual cue.

USER INTERFACE EXAMPLES

Figure 4C:
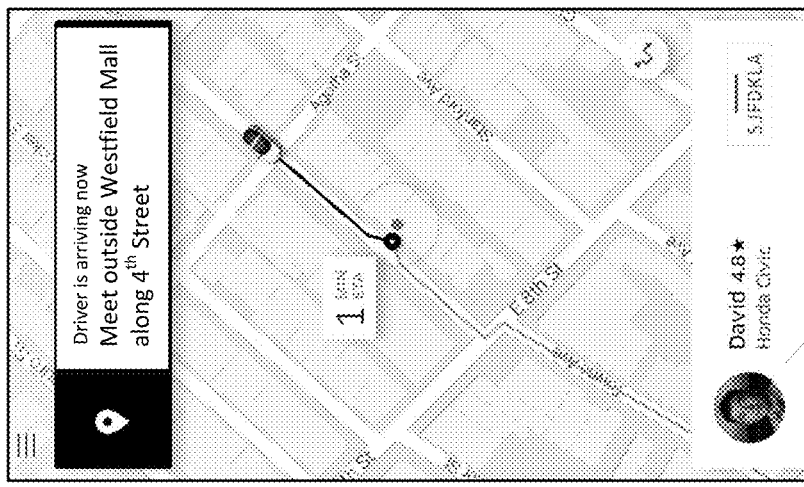
Figure 4B:
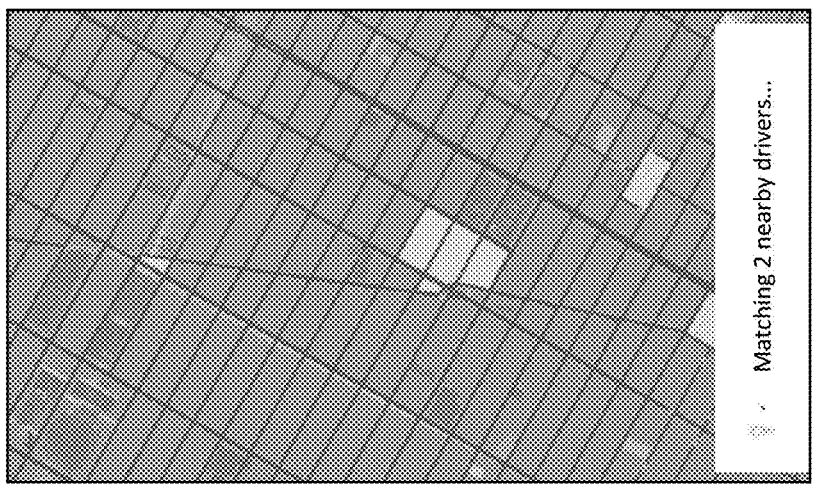
Figure 4A:
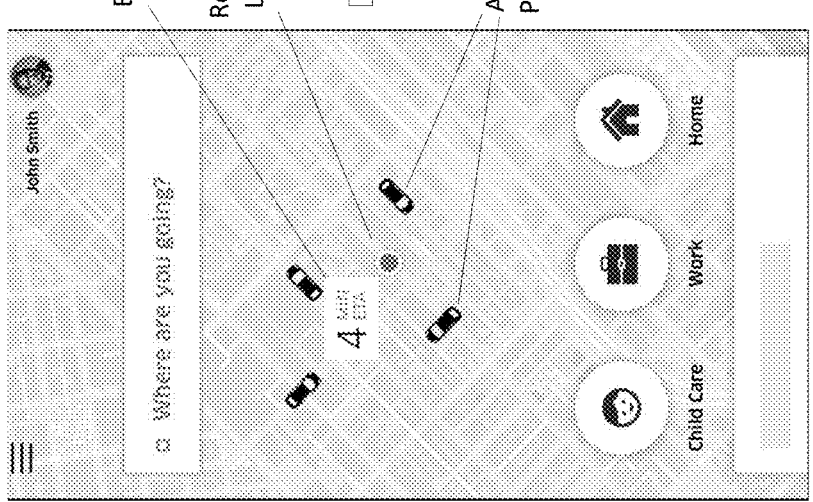

FIGS. 4A-4E illustrate example user interfaces on a service requester device, according to examples described herein. Referring to FIGS. 4A-4C, execution of the service requester application on the service requester device can cause the device to generate the application interface 410. In some aspects, the application interface 410 can include a service requester location 405, available service providers 407, and ETA information 411.

The network computer system can issue a "ghost selection" periodically during programmed time intervals while the service requester application is active (e.g., every 20 seconds). In these ghost selections, an instant selector determines whether an instant selection that meets the acceptable service thresholds is possible. If so, a selection engine can use map data with service provider locations and service requester locations to generate ETA information 411 and find the optimal service provider among the available service providers 407 to respond to a potential service request made through the application interface 410. The instant selector can send ETA information 411 and an indication that instant selection is available. As soon the user issues a service request, the service requester application can immediately let the user know that the request is fulfilled with a promised ETA before the system has committed to and locked in the exact service provider, rather than displaying a requesting screen and forcing the user to wait until a service provider accepts. Meanwhile, the network computer system can contact the available service providers 407 to find one to provide service to the user. Once a service provider accepts an offer to provide service, the network computer system can transmit the selected service provider information 415 to the user device, which can transition to a final service provider selected screen 450 displaying the selected service provider information 415. In other examples, the matching screen 430 can more closely resemble the final service provider selected screen 450, except with the matching text replacing the selected service provider information 415.

FIGS. 4D and 4E illustrate an alternative "show and swap" implementation wherein the service requester application displays a likely service provider screen 460 with likely service provider information 464 in response to making a request for service. As part of the instant selection, the network computer system determines the most likely service provider 467 among available service providers that would be optimal and would accept an offer to provide service to the user. As soon the user issues a service request, the service requester application can display ETA information 411 and the likely service provider information 464 without waiting for a response from the network computer system. In this situation, the service requester application can transition straight from the "request" button press to the likely service provider screen 460.

Once the user makes the service request, the network computer system transmits a service invite to the likely service provider 467. If this service provider accepts, likely service provider 467 becomes the selected service provider. In some examples, the network computer system can send a push notification to the service requester device to confirm that the displayed service provider is the selected service provider. However, if the likely service provider 467 declines the offer or is otherwise unavailable to accept the service request, the selection engine chooses an alternate among the available service providers. Once one of these alternates accepts the offer, the network computer system can send the selected service provider information 415 to the service requester device so that the service requester application 175 displays information for the correct service provider on a service provider swap screen 470. In some examples, the service requester application can inform the user of the change from the likely service provider 467 to the selected service provider with a notification, pop-up window, or other audiovisual cue.

Service Requester Device

Figure 5:
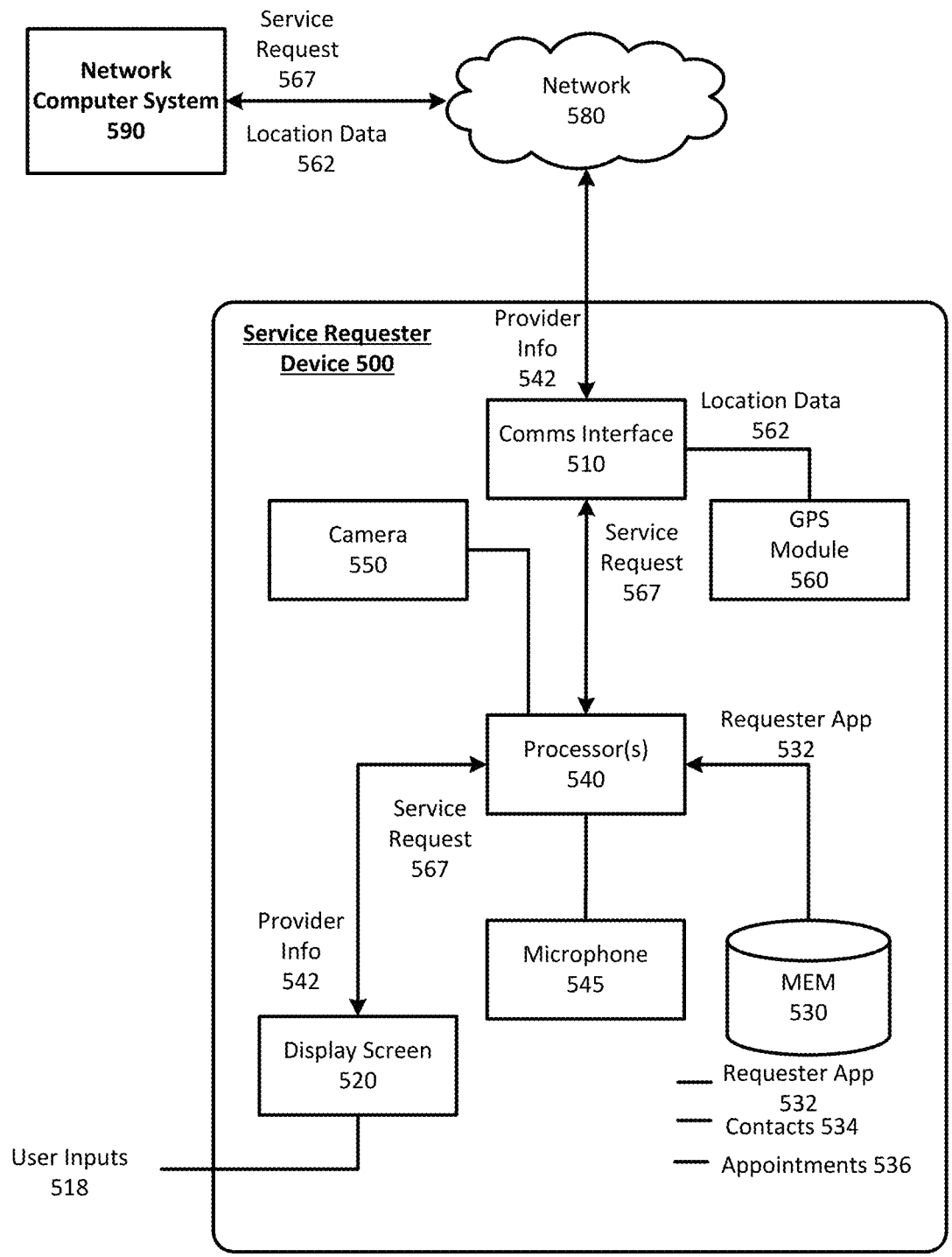
FIG. 5 is a block diagram illustrating an example service requester device executing a designated service requester application for an on-demand service, as described herein.

FIG. 5 is a block diagram illustrating an example service requester device executing a designated service requester application for a service arrangement service, as described herein. In many implementations, the service requester device 500 can comprise a mobile computing device, such as a smartphone, tablet computer, laptop computer, VR or AR headset device, and the like. As such, the service requester device 500 can include typical telephony features such as a microphone 545, a camera 550, and a communication interface 510 to communicate with external entities using any number of wireless communication protocols. In certain aspects, the service requester device 500 can store a designated application (e.g., a service requester application 532) in a local memory 530. In many aspects, the service requester device 500 further store information corresponding to a contacts list 534, and calendar appointments 536 in the local memory 530. In variations, the memory 530 can store additional applications executable by one or more processors 540 of the service requester device 500, enabling access and interaction with one or more host servers over one or more networks 580.

In response to a user input 518, the service requester application 532 can be executed by a processor 540, which can cause an application interface to be generated on a display screen 520 of the service requester device 500. The application interface can enable the user to, for example, check current price levels and availability for the on-demand arrangement service. In various implementations, the application interface can further enable the user to select from multiple ride service types, such as a carpooling service type, a regular ride-sharing service type, a professional ride service type, a van on-demand service type, a luxurious ride service type, and the like.

The user can generate a service request 567 via user inputs 518 provided on the application interface. For example, the user can select a service location, view the various service types and estimated pricing, and select a particular service for service to an inputted destination. In many examples, the user can input the destination prior to service. In addition, the service requester application 532 can generate a service request 567 when executed assuming that certain conditions are satisfied (i.e., the network computer system 590 determines that the service requester is likely to request a service). As provided herein, the service requester application 532 can further enable a communication link with a network computer system 590 over the network 580, such as the network computer system 100 as shown and described with respect to FIG. 1. Furthermore, as discussed herein, the service requester application 532 can display service provider information 542 on the application interface, including service provider information 542 for a likely service provider, a selected service provider, or a matching screen while the network computer system 590 attempts to select an optimal service provider.

The processor 540 can transmit the service requests 567 via a communications interface 510 to the backend network computer system 590 over a network 580. In response, the service requester device 500 can receive a confirmation from the network computer system 590 indicating the selected service provider that will fulfil the service request 567 and rendezvous with the user at the service location. In various examples, the service requester device 500 can further include a GPS module 560, which can provide location data 562 indicating the current location of the requesting user to the network computer system 590 to, for example, establish the service location and/or select an optimal service provider or autonomous vehicle to fulfil the service request 567. In alternative aspects, hard-wired circuitry may be used in place of or in combination with software instructions to implement aspects described herein. Thus, aspects described are not limited to any specific combination of hardware circuitry and software.

Hardware Diagram

Figure 6:
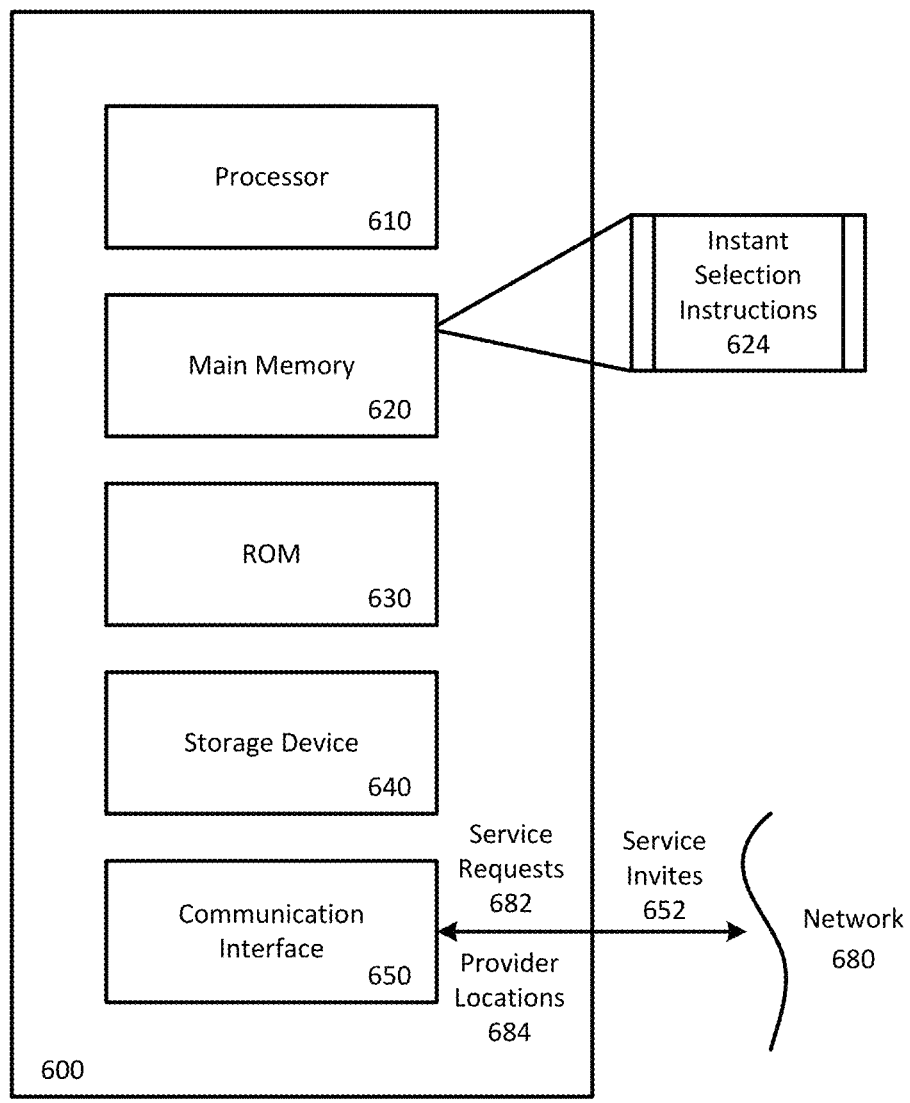
FIG. 6 is a block diagram that illustrates a computer system upon which aspects described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service for providing service services. In the context of FIG. 1, the network computer system 600 may be implemented using a computer system 600 such as described by FIG. 6. The network computer system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, and/or one or more self-driving vehicles. In accordance with examples, the computer system 600 receives service requests 682 from mobile computing devices of individual users. The executable instructions stored in the memory 630 can include instant selection instructions 624, which the processor 610 executes to determine whether to perform an instant selection in response to the service request 682. In doing so, the computer system can receive service provider locations 684 of service providers operating throughout the given region, and the processor can select an optimal service provider from a set of available service providers, and transmit a service invitation 652 to enable the service provider to accept or decline the ride service offer.

By way of example, the instructions and data stored in the memory 620 can be executed by the processor 610 to implement an example network computer system 100 of FIG. 1. In performing the operations, the processor 610 can receive service requests 682 (e.g., via manual input or from instant selection instructions 624) and service provider locations 684, and submit service invitations 652 to facilitate the servicing of the requests 682.

The processor 610 is configured with software and/or other logic to perform one or more processes, steps and other functions described with implementations, such as described by FIGS. 1-4, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network computer system comprising:
one or more processors; and
one or more memory resources storing instructions that, when executed by the one or more processors, cause the one or more processors to:
detect activation of a service application on a computing device of a user;
based, at least in part, on data associated with the user indicating previously requested services by the user, determine that a likelihood of the user requesting service exceeds a confidence threshold;
before receiving a request for service from the computing device of the user, and upon determining that the likelihood of the user requesting service exceeds the confidence threshold, perform a selection process to select a service provider to provide service for the user;
before receiving the request for service from the computing device of the user, transmit, to the computing device of the user, service provider information corresponding to the selected service provider, wherein the service application displays the service provider information in response to the user making the request for service without waiting for a response from the network computer system;
subsequent to performing the selection process, receive, from the computing device of the user, the request for service; and
transmit, to a provider device of the selected service provider, an invitation for providing service for the user.

2. The network computer system of claim 1, wherein the executed instructions cause the one or more processors to periodically determine the likelihood of the user requesting service while the service application on the computing device of the user is active.

3. The network computer system of claim 1, wherein the executed instructions further cause the one or more processors to:
determine service provider liquidity for an area proximate to a current location of the user, the service provider liquidity corresponding to a number of available service providers within the area proximate to the current location of the user;
wherein the determining the likelihood of the user requesting service is further based on the service provider liquidity for the area proximate to the current location of the user.

4. The network computer system of claim 1, wherein the executed instructions cause the one or more processors to determine the service provider liquidity for the area proximate to the current location of the user by determining that one or more service providers are predicted, based on historical data for the area, to activate a service provider application.

5. The network computer system of claim 1, wherein the executed instructions cause the one or more processors to repeatedly perform the selection process prior to receiving the request for service from the computing device of the user.

6. The network computer system of claim 1, wherein the request for service comprises an on-demand transport service for transporting the user to a destination location indicated in the request of service.

7. A non-transitory computer-readable medium storing instructions that, when executed by one or more processors of a network computer system, cause the one or more processors to:
detect activation of a service application on a computing device of a user;
based, at least in part, on data associated with the user indicating previously requested services by the user, determine that a likelihood of the user requesting service exceeds a confidence threshold;
before receiving a request for service from the computing device of the user, and upon determining that the likelihood of the user requesting service exceeds the confidence threshold, perform a selection process to select a service provider to provide service for the user;
before receiving the request for service from the computing device of the user, transmit, to the computing device of the user, service provider information corresponding to the selected service provider, wherein the service application displays the service provider information in response to the user making the request for service without waiting for a response from the network computer system;
subsequent to performing the selection process, receive, from the computing device of the user, the request for service; and transmit, to a provider device of the selected service provider, an invitation for providing service for the user.

8. The non-transitory computer-readable medium of claim 7, wherein the executed instructions cause the one or more processors to periodically determine the likelihood of the user requesting service while the service application on the computing device of the user is active.

9. The non-transitory computer-readable medium of claim 7, wherein the executed instructions further cause the one or more processors to:
   determine service provider liquidity for an area proximate to a current location of the user, the service provider liquidity corresponding to a number of available service providers within the area proximate to the current location of the user;
   wherein determining the likelihood of the user requesting service is further based on the service provider liquidity for the area proximate to the current location of the user.

10. The non-transitory computer-readable medium of claim 9, wherein the executed instructions cause the one or more processors to determine the service provider liquidity for the area proximate to the current location of the user by determining that one or more service providers are predicted, based on historical data for the area, to activate a service provider application.

11. The non-transitory computer-readable medium of claim 7, wherein the executed instructions cause the one or more processors to repeatedly perform the selection process prior to receiving the request for service from the computing device of the user.

12. The non-transitory computer-readable medium of claim 7, wherein the request for service comprises an on-demand transport service for transporting the user to a destination location indicated in the request of service.

13. A computer-implemented method of facilitating transport, the method being performed by one or more processors of a network computer system and comprising:
   detecting activation of a service application on a computing device of a user;
   based, at least in part, on data associated with the user indicating previously requested services by the user, determining that a likelihood of the user requesting service exceeds a confidence threshold;
   before receiving a request for service from the computing device of the user, and upon determining that the likelihood of the user requesting service exceeds the confidence threshold, performing a selection process to select a service provider to provide service for the user;
   before receiving the request for service from the computing device of the user, transmitting, to the computing device of the user, service provider information corresponding to the selected service provider, wherein the service application displays the service provider information in response to the user making the request for service without waiting for a response from the network computer system;
   subsequent to performing the selection process, receiving, from the computing device of the user, the request for service; and
   transmitting, to a provider device of the selected service provider, an invitation for providing service for the user.

14. The method of claim 13, wherein the one or more processors periodically determine the likelihood of the user requesting service while the service application on the computing device of the user is active.

15. The method of claim 13, further comprising:
   determining service provider liquidity for an area proximate to a current location of the user, the service provider liquidity corresponding to a number of available service providers within the area proximate to the current location of the user;
   wherein determining the likelihood of the user requesting service is further based on the service provider liquidity for the area proximate to the current location of the user.

16. The method of claim 15, wherein the one or more processors determine the service provider liquidity for the area proximate to the current location of the user by determining that one or more service providers are predicted, based on historical data for the area, to activate a service provider application.

17. The method of claim 13, the one or more processors repeatedly perform the selection process prior to receiving the request for service from the computing device of the user.

* * * * *